United States Patent [19]

Yoshida et al.

[11] Patent Number: 5,372,041

[45] Date of Patent: Dec. 13, 1994

[54] ACCELERATION SENSOR WITH MAGNETIC FLUX DIRECTING DEVICE

[75] Inventors: Ryouichi Yoshida; Kiyotaka Miyauchi, both of Shiga, Japan

[73] Assignee: Takata Corporation, Tokyo, Japan

[21] Appl. No.: 27,321

[22] Filed: Mar. 3, 1993

[30] Foreign Application Priority Data

Mar. 9, 1992 [JP] Japan .................. 4-050504

[51] Int. Cl.⁵ .............................. G01P 15/08
[52] U.S. Cl. .................. 73/517 R; 324/162
[58] Field of Search .............. 73/517 R; 324/207.21, 324/162, 165

[56] References Cited

U.S. PATENT DOCUMENTS

| | | | |
|---|---|---|---|
| 3,129,347 | 4/1964 | Tognola | 73/517 R X |
| 3,483,759 | 12/1969 | Venetos et al. | 73/517 R |
| 5,149,925 | 9/1992 | Behr et al. | 73/517 R X |

Primary Examiner—Richard E. Chilcot, Jr.
Assistant Examiner—Joseph L. Felber
Attorney, Agent, or Firm—Kanesaka & Takeuchi

[57] ABSTRACT

An acceleration sensor is formed of a coil and a magnet which is capable of moving forward and back relative to the coil in the axial direction thereof. A change in speed applied to the acceleration sensor is detected through a magnitude of voltage generated in the coil due to the movement of the magnet.

6 Claims, 5 Drawing Sheets

ACCELERATION SENSOR WITH MAGNETIC FLUX DIRECTING DEVICE

FIELD OF THE INVENTION

The present invention relates to an acceleration sensor and more particularly, to an acceleration sensor suitable for detecting a large change in speed of a vehicle caused by a collision and the like.

DESCRIPTION OF THE RELATED ART

An acceleration sensor of this kind is described in U.S. Pat. No. 4,827,091. This known sensor comprises a cylinder made of a conductive material, a magnetized inertial member mounted in the cylinder so as to be movable longitudinally of the cylinder, a conductive member mounted at least on an end surface of the inertial member which is on a side of one longitudinal end of the cylinder, a pair of electrodes disposed at the one longitudinal end of the cylinder, an attracting member disposed near the other longitudinal end of the cylinder, and a coil for operation test of the magnetized inertial member wound around the cylinder. When the conductive member of the magnetized inertial member makes contact with the electrodes, these electrodes are caused to conduct via the conductive member. The attracting member is made of such a magnetic material that the attracting member and the inertial member are magnetically attracted towards each other.

In this acceleration sensor, the magnetized inertial member and the attracting member attract each other. When no or almost no acceleration is applied to the sensor, the inertial member is at rest at the other end in the cylinder.

If a relatively large acceleration acts on this acceleration sensor, the magnetized inertial member moves against the attracting force of the attracting member. During the movement of the inertial member, an electrical current is induced in this cylinder, producing a magnetic force which acts on the inertial member in the direction opposite to the direction of movement of the inertial member. Therefore, the magnetized inertial member is braked, so that the speed of the movement is reduced.

When the acceleration is less than a predetermined magnitude, or threshold value, the magnetized inertial member comes to a stop before it reaches the front end of the cylinder. Then, the inertial member is pulled back by the attracting force of the attracting member.

When the acceleration is greater than the predetermined magnitude, or the threshold value, e.g., the vehicle carrying this acceleration sensor collides with an object, the inertial member arrives at the one end or front end of the cylinder. At this time, the conductive layer on the front end surface of the inertial member makes contact with both electrodes to electrically connect them with each other. If a voltage has been previously applied between the electrodes, an electrical current flows when a short circuit occurs between them. This electric current permits detection of collision of the vehicle.

By the way, the magnetized inertial member may be moved to the front end of the cylinder to abut against the electrodes by applying current to the testing coil. Thus the use of the testing coil allows checking the operation of the magnetized inertial member.

However, since the conventional acceleration sensor described above detects that an acceleration greater than a predetermined value has been applied and the magnetized inertial member makes contact with the electrodes, it cannot detect the acceleration if the contact between the magnetized inertial member and the electrodes fails to conduct due to rust and the like. Therefore, it is less reliable.

Further, although the aforementioned conventional acceleration sensor can detect that a large change in speed such that the magnetized inertial member abuts against the electrodes has been applied to the acceleration sensor, it cannot detect the change in speed quantitatively.

SUMMARY OF THE INVENTION

Accordingly, it is an object of the present invention to provide a highly reliable acceleration sensor.

It is another object of the present invention to provide an acceleration sensor which allows to detect a change in speed quantitatively.

In accordance with a first aspect of the invention, there is provided an acceleration sensor comprising a coil and a magnet movable in the axial direction of the coil to detect a change in speed applied to the acceleration sensor from a magnitude of voltage generated in the coil due to the movement of the magnet.

In accordance with a second aspect of the invention, there is provided an acceleration sensor comprising: a cylindrical coil holder provided in a housing; a coil wound around the coil holder, a circular hole-like guide section provided in the housing coaxially with the coil holder, a main magnet which is slidably held by the guide section and whose front end is located in the coil, and at least either one of an iron piece or return magnet which is provided within the housing to attract the main magnet in the direction of pulling out of the coil.

In accordance with a third aspect of the invention, there is provided an acceleration sensor comprising: a cylindrical coil holder provided in a housing; a coil wound around the coil holder; a guide shaft provided within the housing coaxially with the coil holder; a main magnet slidably held by the guide shaft and whose end is located in the coil; and at least either one of iron piece or return magnet which is provided within the housing to attract the main magnet in the direction of pulling out of the coil.

In accordance with a fourth aspect of the invention, there is provided the acceleration sensor of the aspect 2 or 3, wherein a cylindrical yoke is assembled coaxially and integrally with the main magnet, the front end of the cylindrical yoke is surrounding the periphery of the coil and a yoke for turning the magnetic flux from the main magnet in the direction orthogonal to the coil is provided at the front end of the main magnet.

When an acceleration is applied to the acceleration sensor of the invention, the magnet moves in a speed which corresponds to the acceleration. Then a magnitude of voltage which corresponds to the speed of the magnet is generated in the coil. Accordingly, the travel speed of the magnet may be detected by detecting the voltage generated in the coil. Further, the acceleration applied to the acceleration sensor may be quantitatively detected by finding the elapsed change of the travel speed of the magnet by computation and the like.

By the way, in the acceleration sensor according the second aspect of the invention, the magnet moves forward and back through the guide hole of the housing.

In the acceleration sensor according to the third aspect of the invention, the magnet moves forward and back through the guide shaft.

According to the acceleration sensor of the fourth aspect of the invention, the density of magnetic flux applied to the windings of the coil may be increased and be made constant by flowing the flux generated from the magnet in the direction orthogonal to the coil through the yoke. As a result, the voltage generated in the coil is increased, allowing noise-resistant and highly reliable detection of acceleration,

DETAILED DESCRIPTION OF PREFERRED EMBODIMENTS

Figure 1:
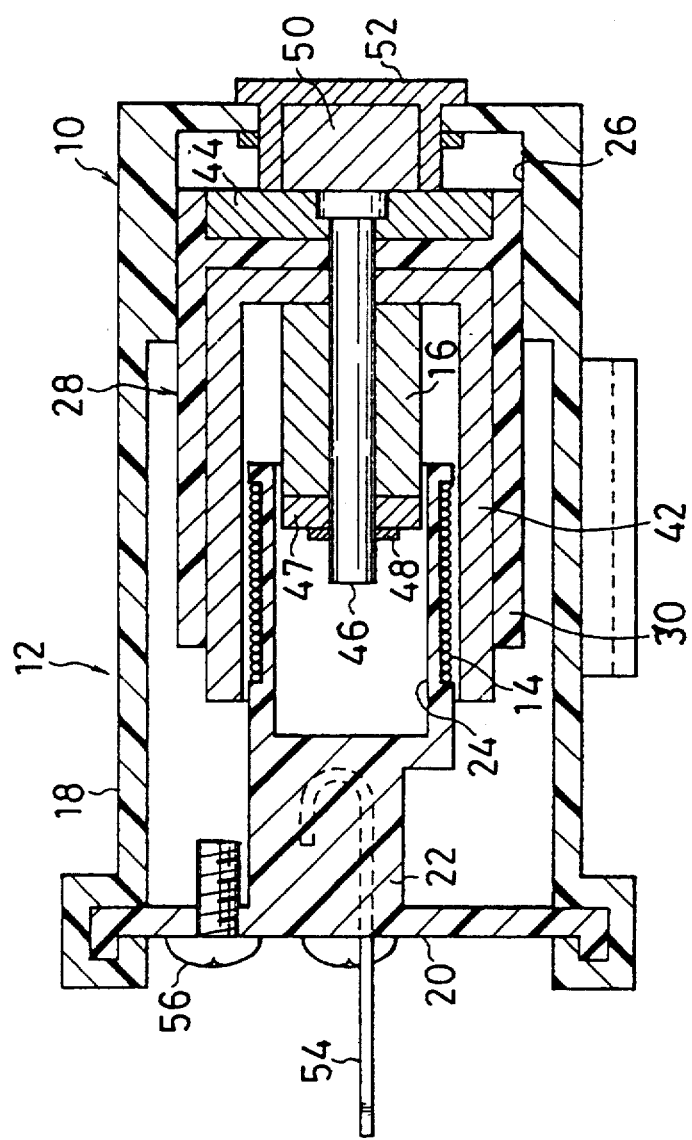
FIG. 1 is a longitudinal section view of an acceleration sensor according to the preferred embodiment of the present invention.
Figure 2:
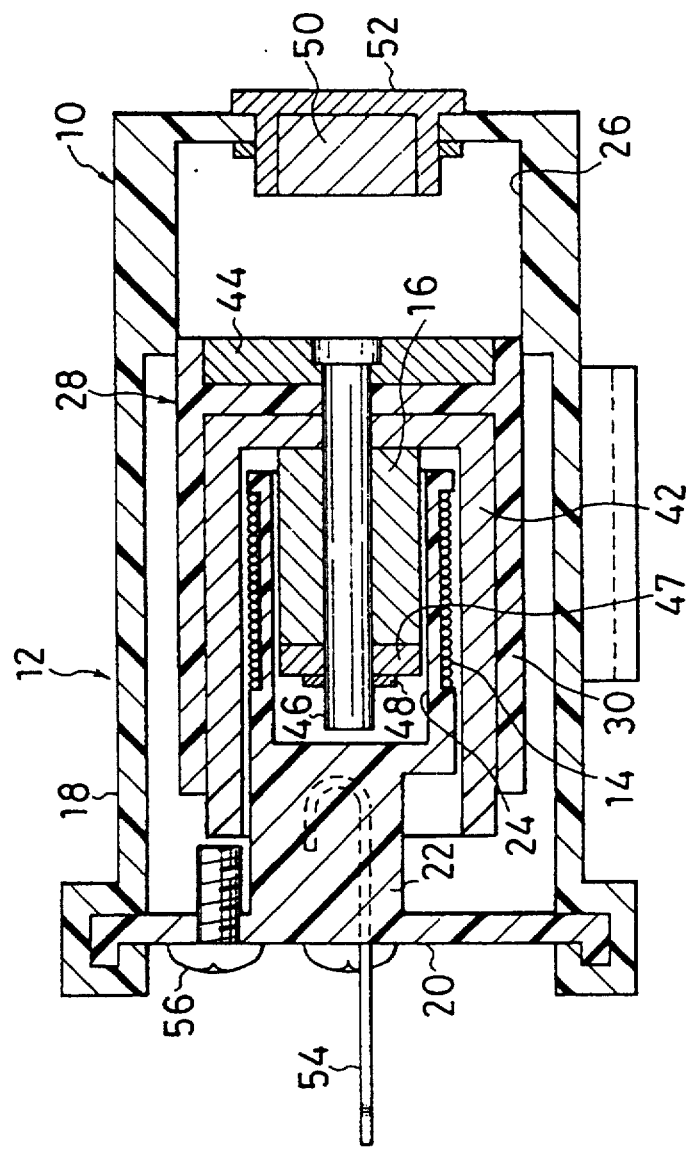
FIG. 2 is a section view showing an operating condition of the acceleration sensor in FIG. 1.
Figure 3:
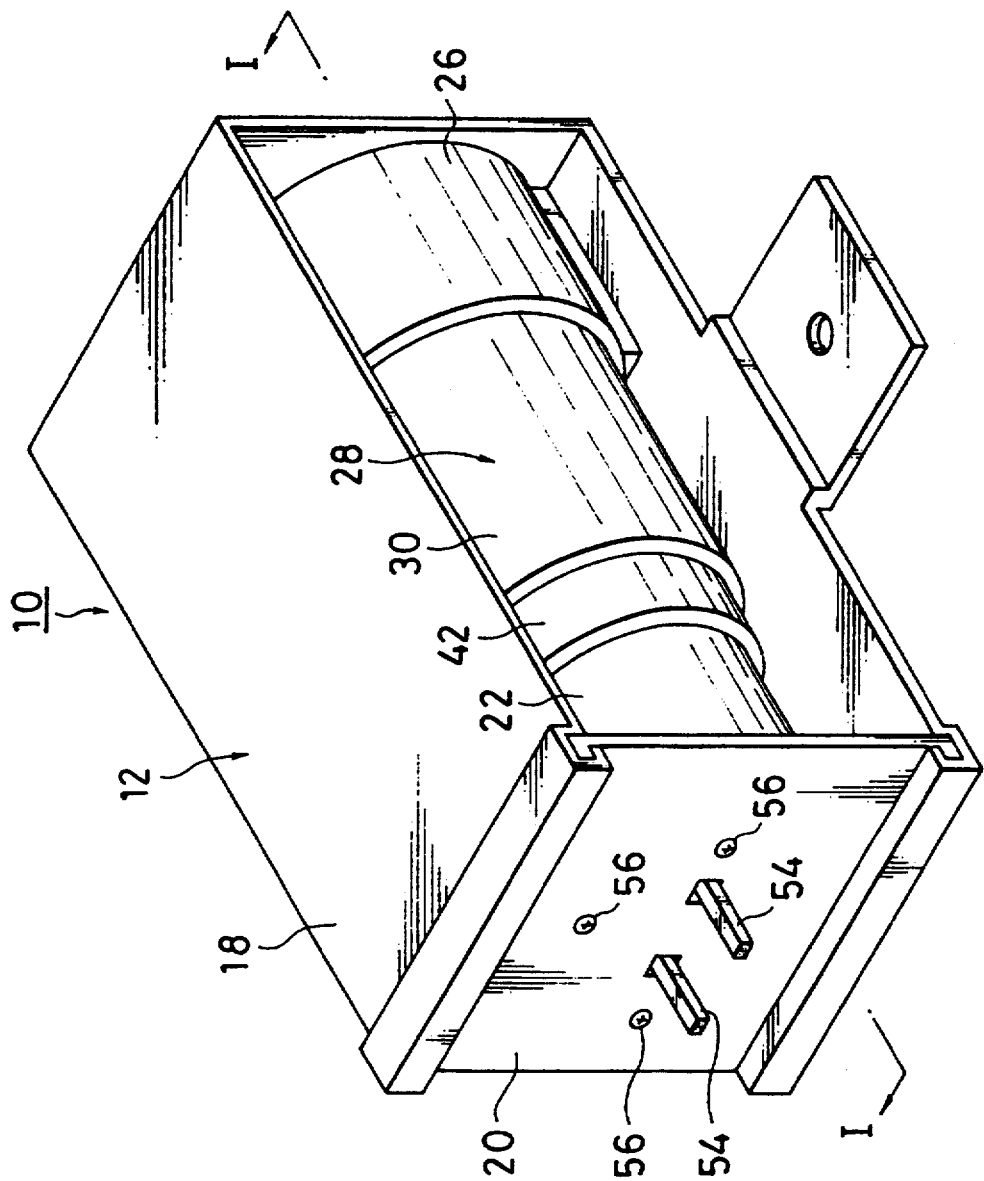
FIG. 3 is a perspective view of the acceleration sensor in FIG. 1.

Referring now to the drawings, preferred embodiments of the present invention will be explained. FIG. 3 is a perspective view of an acceleration sensor according to the preferred embodiment of the present invention; FIG. 1 is a longitudinal section view of the acceleration sensor taken along line I—I in FIG. 3; and FIG. 2 is a longitudinal section view showing an operating condition of the acceleration sensor.

The acceleration sensor 10 includes a coil 14 and a main magnet 16 within a housing 12 thereof. The housing 12 is structured by a housing main body 18 having U-shaped cross section and a front plate 20 attached to the front of the housing main body 18. A boss portion 22 is provided behind the front plate 20 integrally therewith and a cylindrical coil holder 24 is extended from the boss section 22. The coil 14 is wound around the periphery of the coil holder 24.

All of the housing main body 18, front plate 20, boss portion 22 and coil holder 24 are made of synthetic resin.

A circular hole-like guide section 26 is provided on the inner surface of the rear side of the housing main body 18 and a magnet assembly 28 is slidably fitted in the inner surface of the guide section 26.

The magnet assembly 28 comprises a cylindrical case 30 made of a synthetic resin, a cylindrical yoke 42 fitted and fixed into the case 30, a disc yoke 44 fitted and fixed to the case 30, a rod 46 inserted to and fixed at the axial position of the magnet assembly 28 and the cylindrical main magnet 16 fitted around the rod 46. A front yoke 47 for directing the magnetic flux of the main magnet to flow or pass orthogonal to the winding of the coil is secured to the rod 46 by a fixing ring 48.

A return magnet 50 is provided at the rear end surface of the housing 12. The return magnet 50 is fitted in and held by a yoke 52 which is fixed at the rear end surface of the housing main body 18.

A pair of terminals 54 electrically connected with the coil is provided on the front plate 20. Adjuster bolts 56 for limiting the forward movement of the magnet assembly 28 which abuts against the bolts 56 when the assembly 28 moves forward are fixed on the front plate 20.

In the acceleration sensor 10 constructed as described above, when no acceleration is applied to the acceleration sensor 10, the magnet assembly 28 is attracted by the return magnet 50 and thereby the magnet assembly 28 is at rest at the back limit as shown in FIG. 1.

When an acceleration is applied to the acceleration sensor 10 in the left direction in FIG. 1, for example, the acceleration sensor 10 moving in the right direction suddenly stops, the magnet assembly 28 receives a force corresponding to the acceleration and moves in the left direction in FIG. 1 relative to the housing 12. Then the coil 14 generates a voltage that corresponds to the travel or moving speed of the magnet assembly 28 relative to the coil 14. The travel speed of the magnet assembly 28 may be detected by detecting the voltage at the terminals 54. The magnitude of the acceleration applied the acceleration sensor 10 may be detected by finding the travel speed of the magnet assembly 28 in passage of time by computation and the like.

Figure 4:
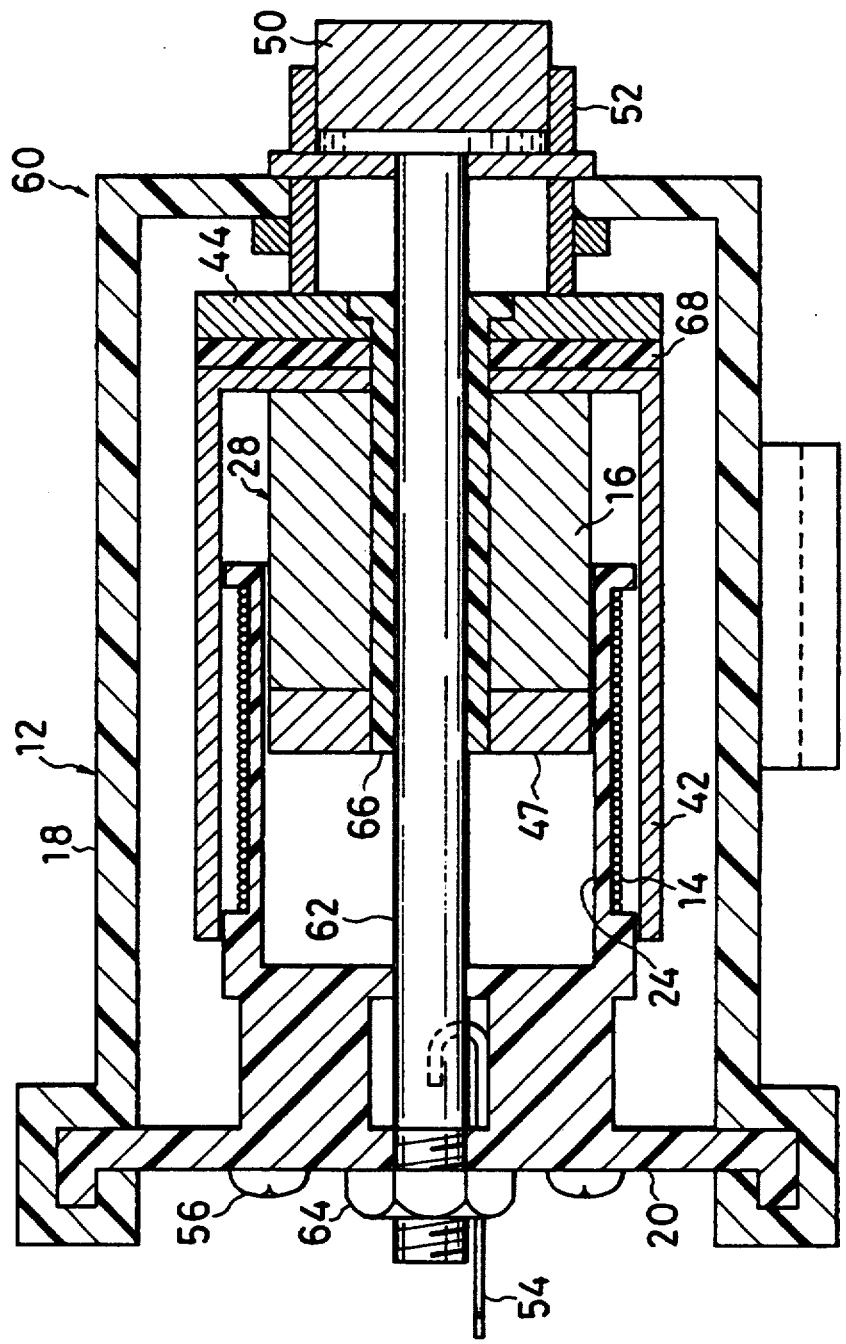
FIG. 4 is a longitudinal section view of an acceleration sensor according to another embodiment of the invention.
Figure 5:
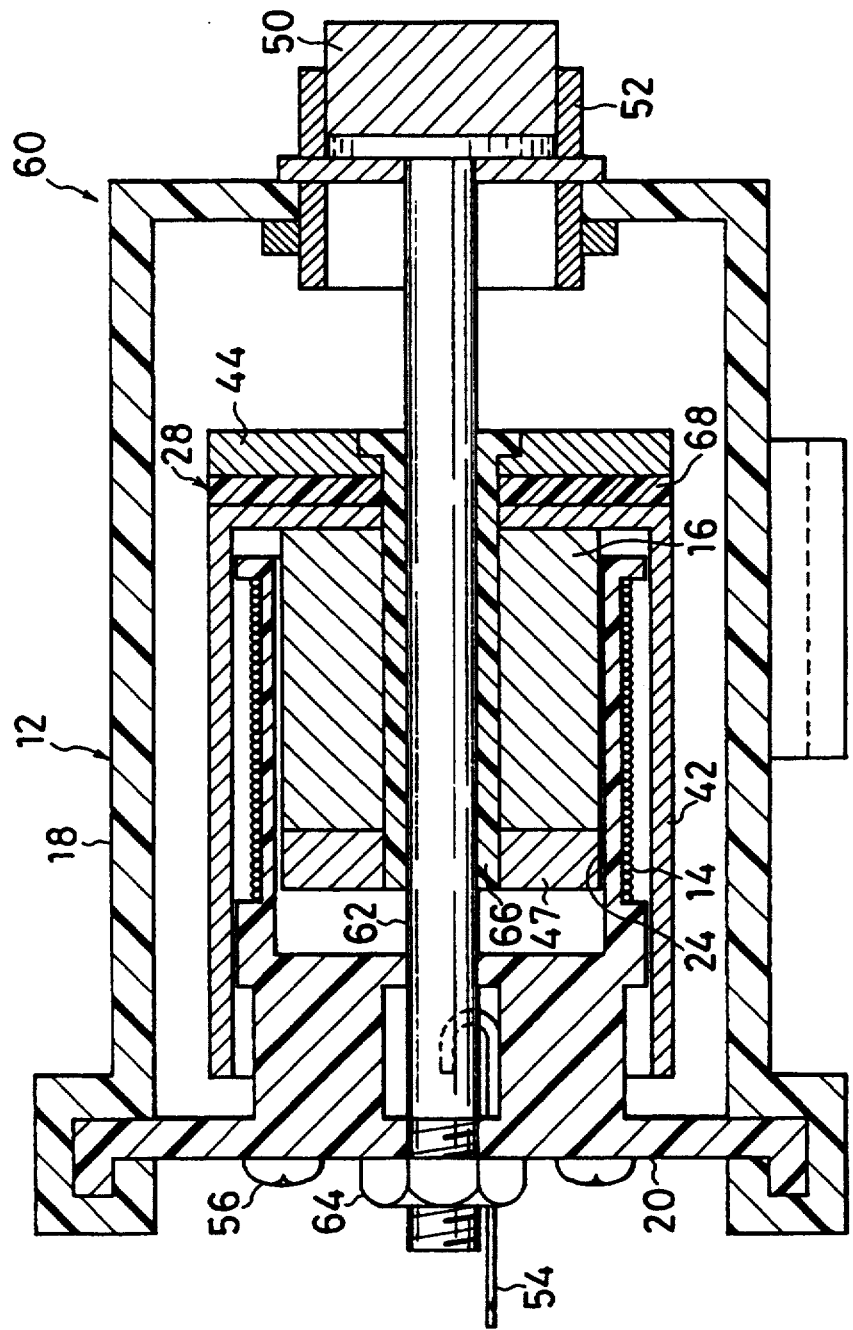
FIG. 5 is a section view showing an operating condition of the acceleration sensor in FIG. 4.

FIG. 4 is a longitudinal section view of an acceleration sensor 60 according to another embodiment of the invention. The acceleration sensor 60 according to the present embodiment has a similar shape and construction with the acceleration sensor 10 described above and the same reference numerals will be designated to the same corresponding parts thereof.

In the embodiment, a guide shaft 62 is attached to the yoke 52 for return magnet 50. It penetrates the coil holder 24 and protrudes at the front surface of the front plate 20. A nut 64 is screwed on the front end of the guide shaft 62 to secure the guide shaft 62 to the housing 12.

A sleeve 66 made of a synthetic resin is provided at the axial position of the magnet assembly 28. The inner surface of the sleeve 66 slidably contacts with the outer surface of the guide shaft 62. A disc spacer 68 made of a synthetic resin is interposed between the disc yoke 44 and the cylindrical yoke 42.

When magnet assembly 28 moves in the left direction in FIG. 4 by an acceleration applied to the acceleration sensor 60, in the acceleration sensor 60 of the present embodiment, the coil 14 generates a voltage whose magnitude corresponds to the travel speed of the magnet assembly 28 relative to the housing 12. Then the travel speed of the magnet assembly 28 may be detected by detecting the voltage through the terminals 54. The magnitude of the acceleration applied to the acceleration sensor may be detected by finding the travel speed in a passage of time by computation and the like.

In the both embodiments described above, the cylindrical yoke 42 is disposed on the peripheral side of the coil 14 and the magnetic flux generated by the main magnet 16 crosses the coil 14 while passing through the yoke 42. Accordingly, since the density of flux crossing the coil 14 is increased and the magnitude of voltage detected at the terminals 54 is increased, it permits noise-resistant and highly reliable detection of changes in speed.

Although the magnet assembly 28 is biased by the return magnet 50 in the aforementioned embodiments, it is also possible to use a spring.

In the embodiments above, the yoke 47 is provided to make the constant density of flux reaching the cylindrical yoke 42 from the yoke 47 transmitting through the coil 14. Therefore, the travel speed of the magnet assembly 28 and the electromotive force of the coil 14 are always proportional to each other.

Further, since the output voltage of the coil 14 immediately increases as the travel speed of the magnet assembly 28 increases, the change in speed may be detected with almost no delay. By the way, the acceleration sensor in U.S. Pat No. 4,827,091 cannot detect that an acceleration greater than a threshold value has been applied until when the magnetized inertial member moves to the position of the electrical contact. Whereas, the acceleration sensor of the present embodiments can detect that a change in speed has exceeded a threshold value at the time when an acceleration more than the threshold value is applied and the travel speed of the magnet assembly 28 exceeds a predetermined value.

In the embodiments above, the travel range of the magnet assembly 28 is limited. That is, the magnet assembly 28 is allowed to move only between the back limit position in FIGS. 1 and 4 and the forward limit position where the magnet assembly 28 abuts against the end of the adjuster bolts 56. Therefore, the output voltage of the coil 14 will not exceed a threshold value unless the travel speed of the magnet assembly 28 exceeds the threshold value during the magnet assembly 28 moves from the back limit position to the forward limit position. In other words, the output voltage of the coil 14 exceeds the threshold value only when a large force is applied to the magnet assembly 28 in a short time and the travel speed of the magnet assembly 28 exceeds the threshold value.

According to the present invention, the output voltage of the coil 14 may be increased to operate a device directly by the coil output by increasing magnetization of the magnet or by increasing the number of turns of the coil 14.

The sensor of the invention may be used also as an analog sensor for outputting a voltage corresponding to a travel speed of the magnet assembly 28.

Although the magnet assembly 28 is moved and the coil 14 is fixed in the embodiments above, it is possible to move the coil 14 and to fix the magnet assembly 28, contrary to the above.

As described above, the acceleration sensor of the present invention permits detection of magnitude of change in speed applied to the acceleration sensor quantitatively. Further, since the sensor of the invention has no electrical contact, it is highly reliable.

According to the acceleration sensor of the fourth aspect of the invention, it is possible to detect the change in speed in high precision.

What is claimed is:

1. An acceleration sensor comprising:
   a cylindrical coil holder provided in a housing;
   a coil wound around said coil holder;
   a circular hole-like guide section provided coaxially with said coil holder in said housing;
   a main magnet slidably held by said guide section;
   a cylindrical yoke assembled coaxially and integrally with said main magnet and surrounding a periphery of the coil;
   a front yoke provided at a front end of the main magnet, said front yoke directing magnetic flux from the main magnet in the direction orthogonal to the windings of the coil; and
   means for attracting the main magnet provided within said housing to attract said main magnet in the direction opposite said coil.

2. An acceleration sensor of claim 1, wherein said front end of the main magnet is located in the coil when no acceleration is applied to the acceleration sensor, and said means for attracting the return magnet is at least one of an iron piece and a return magnet.

3. An acceleration sensor of claim 2, further comprising at least one adjuster bolt formed in the housing, said bolt limiting forward movement of the main magnet.

4. An acceleration sensor comprising:
   a cylindrical coil holder provided in a housing;
   a coil wound around said coil holder;
   a guide shaft provided coaxially with said coil holder within said housing;
   a main magnet slidably held by said guide shaft; and
   a cylindrical yoke assembled coaxially and integrally with said main magnet and surrounding a periphery of the coil;
   a front yoke provided at a front end of the main magnet, said front yoke directing magnetic flux from the main magnet in the direction orthogonal to the windings of the coil; and
   means for attracting the main magnet provided within said housing to attract said main magnet in the direction opposite said coil.

5. An acceleration sensor of claim 4, wherein said front end of the main magnet is located in the coil when no acceleration is applied to the acceleration sensor, and said means for attracting the return magnet is at least one of an iron piece and a return magnet.

6. An acceleration sensor of claim 5, further comprising at least one adjuster bolt formed in the housing, said bolt limiting forward movement of the main magnet.

* * * * *